(12) United States Patent
Heller et al.

(10) Patent No.: US 7,707,318 B2
(45) Date of Patent: Apr. 27, 2010

(54) SYSTEM AND METHOD FOR UPDATING INFORMATION

(75) Inventors: Rainer Heller, Eckental (DE); Thomas Jachmann, Wendelstein (DE); Eduard Zalar, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 601 days.

(21) Appl. No.: 10/527,927

(22) PCT Filed: Sep. 1, 2003

(86) PCT No.: PCT/DE03/02889

§ 371 (c)(1),
(2), (4) Date: Oct. 11, 2005

(87) PCT Pub. No.: WO2004/027643

PCT Pub. Date: Apr. 1, 2004

(65) Prior Publication Data

US 2006/0112380 A1      May 25, 2006

(30) Foreign Application Priority Data

Sep. 16, 2002   (DE) .............................. 102 42 918

(51) Int. Cl.
G06F 15/16    (2006.01)
G06F 15/173   (2006.01)
G06F 3/048    (2006.01)
G09G 5/00     (2006.01)

(52) U.S. Cl. ................. 709/248; 709/224; 715/765; 715/781; 345/4

(58) Field of Classification Search ................. 709/220, 709/236, 246, 224, 248; 710/31, 62, 100; 715/765, 781; 345/3.1, 4

See application file for complete search history.

(56) References Cited

U.S. PATENT DOCUMENTS

| 5,019,963 | A | * | 5/1991 | Alderson et al. ............ 364/200 |
| 5,564,051 | A |   | 10/1996 | Halliwell et al. |
| 5,713,017 | A |   | 1/1998 | Lin et al. |
| 5,764,992 | A |   | 6/1998 | Kullick et al. |
| 6,006,034 | A |   | 12/1999 | Heath et al. |

(Continued)

FOREIGN PATENT DOCUMENTS

DE             101 32 038 A1    1/2003

(Continued)

OTHER PUBLICATIONS

T. Berners-Lee, R. Fielding, U.C. Irvine and L. Masinter, "Uniform Resource Identifiers (URI): Generic Syntax", IETF Network Working Group RFC 2396, Online, Aug. 1998, XP002272087, Retrieved from the Internet: URL:http://www.ietf.org/rfc/rfc2396.txt>, Retrieved on Mar. 2, 2004, pp. 1-34.

*Primary Examiner*—Ario Etienne
*Assistant Examiner*—Hee Soo Kim

(57) ABSTRACT

The invention relates to a system and a method for updating information displayed on a client in a process data-driven environment. An updating stamp is provided along with information units used for displaying process data of automation devices in a browser during collection thereof. The updating stamp is compared with an updating stamp which is managed in a system and is updated whenever new information is added for the respective information unit, the information being updated in the browser if the updating stamps are not identical.

14 Claims, 1 Drawing Sheet

U.S. PATENT DOCUMENTS

| | | | |
|---|---|---|---|
| 6,061,715 A * | 5/2000 | Hawes | 709/203 |
| 6,434,744 B1 | 8/2002 | Chamberlain et al. | |
| 6,505,247 B1 * | 1/2003 | Steger et al. | 709/224 |

FOREIGN PATENT DOCUMENTS

| | | |
|---|---|---|
| EP | 0 284 924 A2 | 10/1988 |
| GB | 2 333 864 A | 8/1999 |
| JP | 2000089818 A | 3/2000 |
| JP | 2001109715 A | 4/2001 |
| WO | WO 00/73901 A1 | 12/2000 |

* cited by examiner

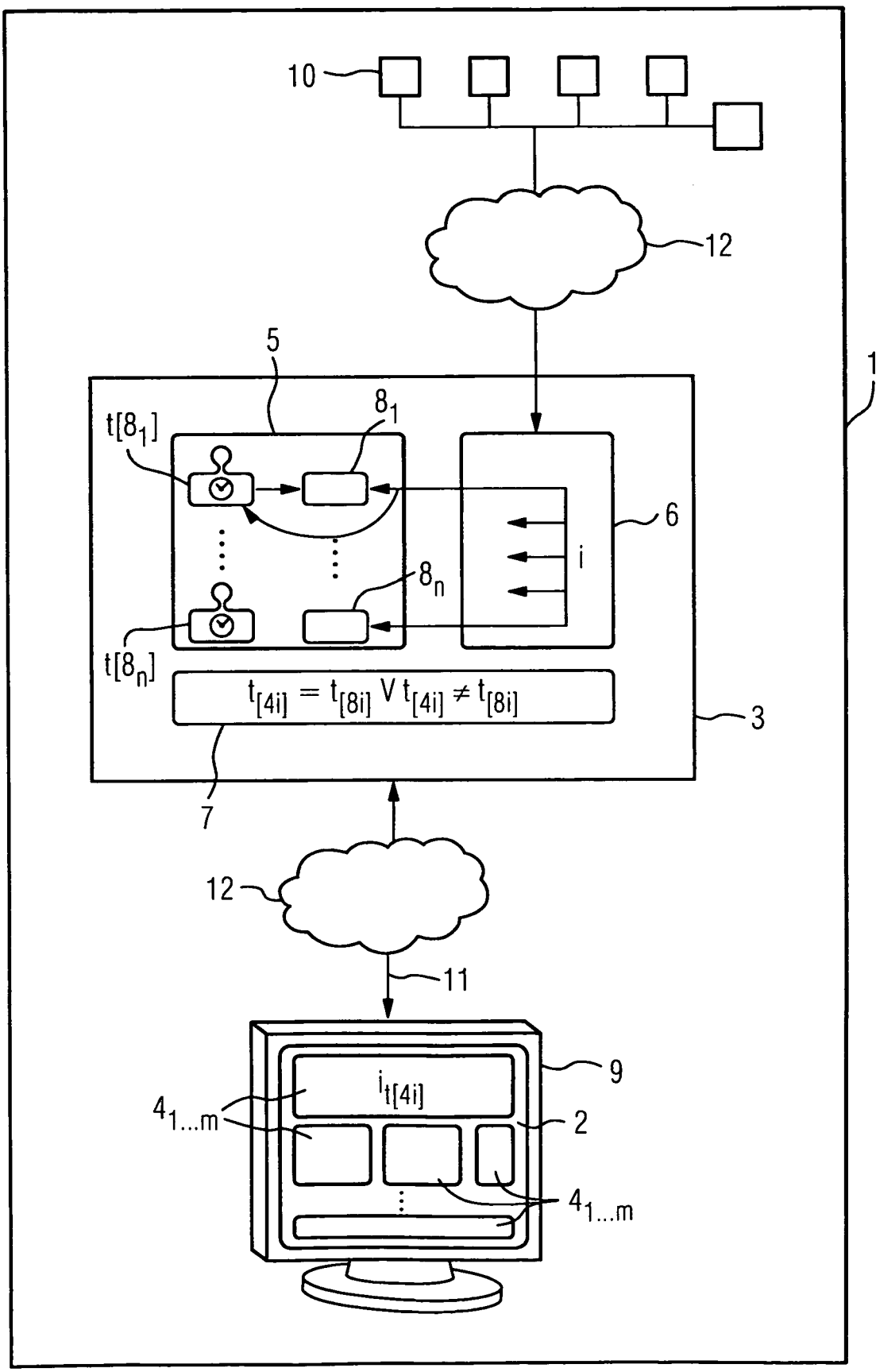

SYSTEM AND METHOD FOR UPDATING INFORMATION

CROSS REFERENCE TO RELATED APPLICATIONS

This application is the US National Stage of International Application No. PCT/DE2003/002889, filed Sep. 1, 2003 and claims the benefit thereof. The International Application claims the benefits of German application No. 10242918.9 filed Sep. 16, 2002, both applications are incorporated by reference herein in their entirety.

FIELD OF THE INVENTION

The invention relates to a system and a method for providing information on a client and for updating the information provided.

BACKGROUND OF THE INVENTION

Communications in a Web environment generally involve two different groups of participants. On the one hand there are Web servers, which make available information in the form of displayable pages, and on the other hand there are Web clients (so-called browsers) which display the pages made available by the Web servers. In general a client/server system is therefore organized in such a way that the server does not know its clients. The latter normally only call up the required information from the Web server as a result of user actions. Accordingly, a new Web page is then downloaded to the client, or a new version of the same page is generated. Nowadays, client/servers systems of this type are also increasingly being used in the industrial environment. In this case, the clients are used primarily for displaying information relating, for example to industrial production processes. In a system of this type, new items of information are continuously coming in, via the programmable controllers or diagnostic devices such as sensors, as applicable, and must be displayed to the user of the client, for example a plant operator. These items of information are sent from the programmable controllers or diagnostic devices, as applicable, to the server, and the clients can retrieve the required data from the server. The problem with a client/server system of this type in an industrial environment is that the client is not in general made aware that the values which it is displaying on a page have now changed in the industrial process, so that its display no longer corresponds with the reality. Nowadays, the updating of information is effected by the Web client, after a defined time interval, automatically making a new request for the appropriate information, and refreshing its Web page if necessary. However, the disadvantage with this is that while the Web page is being refreshed it is not displayed to the user of the client, so that for a brief time no information is available to the user for operational purposes. In addition, the inflexible use of a time interval for updating purposes has the consequence that a page is frequently refreshed and requested, even though there is no new information. Superfluous page refreshment and data transfer is thus the rule with this application. Another possible way of supplying the user with up-to-date information consists in establishing a longer term connection between the client and the server. However, this ties up resources on the server, and a special infrastructure must exist on the client. Realizing the updating of items of information in this way is thus relatively expensive.

U.S. Pat. No. 5,713,017 discloses a method by which the updating of data in a fault-tolerant file system is managed with the help of counters.

SUMMARY OF THE INVENTION

The object underlying the invention is to specify a system and a method which update the items of information displayed on a client in a simple way.

This object is achieved by a system for updating the items of information, displayed on at least one client, which has a server to provide the items of information, at least one information unit for displaying the items of information on a client, a data transmission device for transmitting new items of information on the server and/or for transmitting items of information between the server and at least one client, first facilities for the management of identifiers used to identify information units and for assigning an update stamp, in each case to one identifier, second facilities for assigning newly-received items of information to the identifiers and for the purpose of updating the update stamp, and third facilities for comparing the update stamp, assigned to the information unit concerned, with the current stamp.

The object is further achieved by a method for the updating of items of information displayed on at least one client, whereby the items of information are provided on a server, the items of information are displayed on a client in at least one information unit, new items of information on the server and/or items of information are transmitted between the server and at least one client by a data transmission device, identifiers used to identify information units are managed by first facilities and the first facilities assign an update stamp to each identifier, newly-received items of information are allocated to the identifiers by second facilities and the update stamp is updated by the second facilities, and the third facilities compare the update stamp, assigned to the information unit concerned, with the current update stamp.

The invention is based on the recognition that items of information which are displayed on a client, in particular a browser or Web client, as applicable, must be updated at different points in time, depending on the source of the information. In order to update these items of information on the client with little cost, only when required, after a change, the pages and contents which are displayed on the browser are allowed to "age". For this purpose, each of the pages concerned which is displayed on the browser is supplied together with a so-called update stamp. This update stamp is managed centrally by a Web service, and is supplied to the clients concerned together with the pages. In doing this, data areas which belong together are identified by an identifier. The Web service within the system then realizes correspondingly the management of the identifiers and the associated update stamps.

The Web service can provide information about how up-to-date an identifier is. To do so, the Web service compares the update stamp assigned to the identifier with the update stamp supplied by the Web client. If new information arrives in the system from external devices, and this is for example stored on the server, then the update stamp associated with this information will be appropriately updated. A simple but effective implementation of the change stamp can be effected by simple counters. The browser or Web client can now, at regular intervals, compare the update stamp originally supplied with the information with the current update stamp held in the system. The system then knows exactly whether the content of a page is out-of-date.

A further advantageous embodiment is characterized by the fact that provision is made for the updating of the items of information displayed in an information unit when the update stamps differ. Only when there is a difference, that is the update stamps are not the same, is the corresponding information reloaded into the browser. In this situation, it is also possible to give independent update stamps to the individual units on a page in the browser, so that several data areas can be supplied independently of each other with items of information for the user. The updating of the information is then carried out exactly when required, which leads to a reduction in the data traffic and eliminates superfluous page refreshing on the client.

A further advantageous embodiment is characterized by the fact that the system is intended for the updating of items of information relating to an industrial production process. Client/server systems for displaying production process data are nowadays becoming ever more common in the industrial environment. Increasingly, the operators of a plant are nowadays supplied with items of information by mobile so-called "thin clients". In the production process, new items of information for a user arise at irregular intervals, from data supplied by diagnostic devices or sensors, as applicable. The updating of these items of information can be effected advantageously by the system in accordance with the invention. Of particular interest here are process values which are visualized or, for example, items of event list information for a controller, or items of information about a data module in a controller. The main advantage is that the items of information in the information units concerned, that is in separate data areas in which items of information from different sources can be combined together, can be updated in a window on the client. In this situation, the individual information units can be subject to a different updating mode.

A further advantageous development of the invention is characterized by the fact that the client takes the form of a device for operating and monitoring the production process.

The main advantage in this case is that conventional operating and monitoring devices, such as are today used in plants in an industrial environment, can be used within the framework of the system in accordance with the invention. These devices for operating and monitoring a production process are generally more robust, and adapted to the harsh environmental conditions which prevail in a production plant. In addition, the use of operating and monitoring devices also permits interaction between the user concerned and the server. The user thus not only gets information displayed, thus having a passive role, but instead can also issue to the server, via the client, commands which in some cases will effect changes within the framework of the production process. In order to control the plant, the user thus does not need, after having been supplied with information, to go to a special device or terminal in order to input his commands for the purpose of operating the plant. In addition, it is also possible to use simple devices which require solely a Web browser, that is thin clients.

A further advantageous development of the system is characterized by the fact that the server is intended for the purpose of making available items of information received from programmable controllers or systems, as applicable, and/or diagnostic devices or systems, as applicable. Thus all the data relevant for the production process on a plant is directly stored on the server itself, within the system in accordance with the invention. This advantageous development of the invention renders superfluous the provision of special additional data processing systems, on which the plant information is held. This ensures that the introduction of the system into a plant is inexpensive. If appropriate, then where required on security grounds a redundant server arrangement can be installed, on which are mirrored the relevant data for the plant and for the production process. There are no further installation costs, because no further functionality needs to be present on the client other than a browser.

A further advantageous development of the invention is characterized by the fact that the server takes the form of a Web server. This gives the possibility of transmitting the information using Web protocols, in the way which is nowadays common. This enables standard techniques such as Web service, HTML, ECMA script to be used.

A further advantageous development is characterized by the fact that the first facilities and/or the second facilities and/or the third facilities are provided for the purpose of installation on the server. No further hardware systems are required for the relevant services for the management of identifiers and update stamps and for the updating of the update stamps and for the updating of items of information received from the programmable controllers. This ensures that the system is inexpensive to realize.

A further advantageous development of the invention is characterized by the fact that the identifiers provided are special Uniform Resource Identifiers (URIs) as used in the Web environment.

In the Web environment, it is the common practice to use so-called Uniform Resource Identifiers (URIs) for the purpose of identifying resources. URIs are therefore also used for the identification of data areas. Each page is identified by an appropriate URI. The Web service (a so-called URI validator) within the system then realizes the management of the identifiers and their associated update stamps. The Web service can provide information about how up-to-date a URI, i.e. an identifier, is. The use of the URIs permits a simple realization of the proposed system.

A further advantageous development of the invention is characterized by the fact that the data transmission device takes the form of an Intranet and/or the Internet. The use of such a network permits a decentralized organization within the system in accordance with the invention. A server need not necessarily, for example, be sited on a production plant, but it can also receive its items of information from the programmable controllers from a distance, via an Intranet or the Internet. Likewise, the browser or client, as applicable, on which the information is kept available and updated, need not necessarily be in the immediate neighborhood of the server. An organization of this type has the advantage that one server can supply items of information to several clients at different locations. This makes possible decentralized control and monitoring of the entire production process. The mobility of the entire system is increased.

The invention is described and explained in more detail below by reference to the exemplary embodiment shown in the sole figure.

BRIEF DESCRIPTION OF THE DRAWING

FIG. 1: shows a schematic representation of the system for providing and updating items of information which are displayed on a client.

DETAILED DESCRIPTION OF THE INVENTION

FIG. 1 shows a schematic representation of an exemplary embodiment of the system 1 for updating items of information. Here, the items of information are displayed for a user by means of a browser 2. This browser can be installed on any required client 9. Within the browser, there is the capability for defining various information units $4_i$. The information which is to be displayed can be updated within the relevant information units $4_i$ independently of each other. In the exemplary embodiment described, the information is managed on a server 3, and is made available by the server 3 to the browser 2 or the client 9, as applicable. Here, an identifier $8_i$ is assigned to each information unit $4_i$. This identifier serves to identify the corresponding information unit $4_i$. An update stamp $t(8_n)$ is assigned to each identifier. By this assignment, each information unit $4_i$ is provided with its associated current update stamp $t(8_i)$. The management of the identifiers $8_{1...n}$ and update stamps $t[8_{1...n}]$ is effected with the help of the facilities 5. In the exemplary embodiment, facilities 6 are also provided on the server 3 for assigning newly-received items of information to the relevant identifiers $8_{1...n}$. If new information is delivered, then the update stamp for the relevant identifier is updated. In the exemplary embodiment the information to be displayed is supplied, as applicable, by programmable controllers or diagnostic devices 10. A comparison between the update stamp $t[4_i]$ assigned to an information unit $4_i$ and the current update stamp $t[8_i]$ managed by the facilities 5 is realized by the facilities 7. The transmission of data within the system 1 is effected with the help of a data transmission device 11 which, in the exemplary embodiment, takes the form of an Intranet/the Internet 12.

The special feature of the exemplary embodiment of the system 1 shown in FIG. 1 consists in the fact that items of information, which are displayed on a browser 2 in information units $4_{1...m}$, so to speak "age". A simple mechanism is proposed to permit the aging of the items of information which are to be displayed. With this, an update stamp $t[4_i]$ is supplied together with each unit of information $4_i$ which is to be displayed, this being created on a server 3 at the point in time when the information is received or created, as applicable. This update stamp $t[4_i]$ is assigned to an identifier $8_i$, which is assigned to the information unit $4_i$ concerned. The management of the update stamps $t_{1...n}$ and the identifiers $8_{1...n}$ is maintained by so-called Web services 5 realized on the Web server 3. Here, special Uniform Resource Identifiers (URIs) used in the Web environment are used as the identifiers $8_{1...n}$. Each page is identified by an appropriate URI. The Web service 5, a so-called URI validator, realizes the management of the identifiers $8_{1...n}$ and the associated update stamps $t_{1...n}$. The validator 5 can give information about how current a URI is, either by sending back the update stamp $t[4_i]$ assigned to the URI $8_i$ or by comparing the latter with an update stamp supplied at the same time, as appropriate. The URI used need not necessarily always relate to a whole page, but it can relate to an identifiable information unit $4_i$ which is displayed in the browser 2. Thus for example, a Web page can consist of several information sections $4_{1...m}$, which are subject to a different mode of updating. In automation technology, process values which are to be visualized or, for example, items of event-list information for a controller or items of information about a data module in the controller, are here of particular interest. To each of these information blocks $4_i$ is assigned a URI. A client 9 can inquire selectively, using the different URIs, whether a particular information section, which is identified by the URI, is still current or not. When a page is being generated on the Web server 3, the Web server asks the Web service 5 for the current update stamps $t[4_i]$ appropriate for the URIs $8_i$ which are associated with the page or the information unit $4_i$, as applicable. If there is not yet an entry for this URI (first call), the current update stamp will be returned and the Web service 5 will enter this into its management procedures. In each case, a page or information unit $4_i$ generated by the Web server 3 will contain either as a cross-reference or directly any client-side script code for the client-side implementation of the Web service client, the URIs for the information units displayed on the page, together with the update stamps which were specified for the individual URIs when the page or information units, as applicable, were being created. Using the Web service implementation 7, a request is made to the URI validator Web service 5 for the update stamp $t[8_i]$ of the URIs. If the update stamp $t[8_i]$ differs from the value $t[4_i]$ noted in the Web page, the information which is to be displayed has changed and an appropriate reaction can be effected. Alternatively, it is also possible for the update stamp $t[8_i]$ to be sent at the same time to the URI validator Web service 5, and the latter then only supplies the information—data out-of-date yes/no. If the reply to a query to the URI validator Web service 5 has not yet come back, no further query will be sent off. This reduces the query load on the Web server 3, and also the complexity of the implementation at the client 9. A function which runs cyclically for the Web page on the client 9 can determine how long it takes before replies are received to a URI validator Web service query. In this way, if a selectable time limit is exceeded it is then possible to react appropriately, for example by initiating an error scenario, or by the appearance of a note for the user of the system 1, by which the user is requested to check the operability of the system 1. The updating of the update stamp is realized on the server 3 by special facilities 6 for assigning newly received items of information to the identifiers (URIs) $8_{1...n}$ and for updating the update stamp from t to t+1 when items of information are newly received. This updating service 6 knows the assignment between URI $8_i$ and the items of information to be updated. Whenever there is a change to the items of information, for example process values which are sent to the server by diagnosis and automation devices 10, the updating service calls up the URI validator Web service 5 with the associated URIs, and thereby updates the update stamp t. For the sake of simplicity, the update stamp t can be a counter, which is incremented when there is a change. Apart from the simple mechanism, of using update stamps t to age information which is to be displayed on a browser 2, which permits the selective updating of this information, the system proposed is advantageous above all for the fact that standard techniques can be used for its implementation. Most browsers have client-side scripting (e.g. ECMA Script), which is a standardized language for use in Web browsers. Using this language it is today already possible on the most common browsers to fall back on existing Web service client implementations. If such an implementation does not exist then, assuming there is a scripting capability, one can be created by the user. Thus, an open standard can be used and expensive specific solutions are avoided. Further advantages of the system proposed are the ability to react flexibly to changes in information, together with the fact that no long-term connection to the server 3 is necessary. The proposed solution is, in addition, compatible with a firewall, which represents an important factor for data security within companies. There are further advantages in the scalability of the proposed solution, and in the fact that the demands on the run-time environment on the client 9 are reduced.

In summary the invention relates to a system 1 and a method for updating items of information displayed on a client 9 in a process-data-driven environment. Information units 4, which serve to display process data from programmable controllers 10 in a browser 2, are also supplied with an update stamp t when they are created. The update stamp is compared with an update stamp t+1, which is managed in the system 1 and is updated when new information is added in for the information unit 4 concerned. If the update stamps are not the same, the information in the browser 2 is updated.

The invention claimed is:

1. A system for updating a set of multiple items of information displayable on a client display in order to monitor and control a manufacturing production process, the system comprising:
- a server connected to receive the multiple items of information from a programmable controller or from a diagnostic device in a manufacturing plant and configured to provide the items of information to the client for viewing all of the set of multiple items at one time on the client display;
- first mechanisms for defining an information unit for each of the multiple items in the set, assigning to each unit an identifier, managing the identifiers to identify the information units and assigning an update stamp to each identifier;
- a data transmission device for receiving new items of information or transmitting the new items of information between the server and the client to provide updated information units on the client display;
- second mechanisms for assigning the new items of information, each corresponding to an updated item, to the identifiers and for each new item also assigning a new update stamp indicating that the new item is a more current information unit than an information unit previously assigned to the same identifier; and
- third mechanisms for sending an updated information unit to the client to replace an information unit having the same identifier and already used in the display based on whether a new update stamp has been assigned.

2. The system in accordance with claim 1, wherein one of the information units in the display is updated based on whether a new update stamp has been assigned to it and wherein one of the information units in the display is not updated in the absence of a new update stamp having been assigned to it.

3. The system in accordance with claim 1, wherein the server is adapted for providing items of information received from programmable controllers or systems, and/or diagnostic devices or systems.

4. The system in accordance with claim 1, wherein the server is a Web server.

5. The system in accordance with claim 1, wherein the first mechanisms and/or the second mechanisms and/or the third mechanisms are provided for the purpose of installation on the server.

6. The system in accordance with claim 1, wherein the identifiers are Uniform Resource Identifiers as used in the Web environment.

7. The system in accordance with claim 1, wherein the device for the transmission of data takes the form of an Intranet and/or the Internet.

8. A method for displaying and updating multiple items of information relating to control of a manufacturing production process in an industrial plant system for display on at least one client, the method comprising:
- providing the items of information from a programmable controller or diagnostic device in the plant to make data relevant to control of the manufacturing production process available on a server;
- displaying the multiple items of information together in a screen view on a client display wherein the individual items of information are separately identifiable and provided in the form of information units such that information units corresponding to different items of information are separately assigned time stamps and are separately updatable;
- providing identifiers to identify individual ones of the information units;
- transmitting multiple new items of information from the programmable controller or diagnostic device in the plant, each new item corresponding to an update to an information unit previously assigned a time stamp, to the server or to the at least one client;
- assigning each of the new items of information to one of the identifiers and assigning to each said new item a updated time stamp which indicates that said new item is an update relative to a previously received and displayed item of information assigned to the same identifier; and
- determining by comparing values of an updated stamp with a previously assigned time stamp whether any of the items of information has been modified relative to a previously received item.

9. The method in accordance with claim 8, wherein different ones of the items of information displayed according to the information units are each updated when a comparison indicates that an updated time stamp has been assigned to an associated identifier.

10. The method in accordance with claim 8, wherein a device for operating and monitoring the production process is used as the client.

11. The method in accordance with claim 8, wherein a Web server is used as the server.

12. The method in accordance with claim 8, wherein the step of determining by comparing values of an updated stamp with a previously assigned time stamp is performed on the server.

13. The method in accordance with claim 8, wherein the identifiers are special Uniform Resource Identifiers as used in an Internet or Intranet environment.

14. The method in accordance with claim 8, wherein the device for the transmission of data is an Intranet and/or the Internet.

* * * * *